United States Patent [19]

Fukaya

[11] Patent Number: 4,760,245

[45] Date of Patent: Jul. 26, 1988

[54] METHOD AND APPARATUS FOR PROVIDING A VOICE OUTPUT FOR CARD-BASED AUTOMATIC TRANSACTION SYSTEM

[75] Inventor: Sadao Fukaya, Owariasahi, Japan

[73] Assignee: Hitachi, Ltd., Tokyo, Japan

[21] Appl. No.: 10,485

[22] Filed: Feb. 3, 1987

[30] Foreign Application Priority Data

Mar. 7, 1986 [JP] Japan .................................. 61-48305

[51] Int. Cl.$^4$ .............................................. G06F 15/30
[52] U.S. Cl. .................................... 235/379; 235/380; 235/381
[58] Field of Search ........................ 235/379, 380, 381

[56] References Cited

U.S. PATENT DOCUMENTS 4,593,183 6/1986 Fukatsu ............................. 235/379

FOREIGN PATENT DOCUMENTS 59-149560 8/1984 Japan.
60-10387 1/1985 Japan.

*Primary Examiner*—David L. Trafton
*Attorney, Agent, or Firm*—Fay, Sharpe, Beall, Fagan, Minnich & McKee

[57] ABSTRACT

In an automatic transaction system such as a cash dispenser, a telephone or a ticket vending machine having a card reader for reading the content of a card and a voice output unit for guiding an operation procedure following a card loading with synthesized speech, when a card in which a data of user's hearing sensitivity is recorded/embossed is inserted, the hearing sensitivity data is read out from the card the voice output unit is accordingly controlled to output an indication voice or a guidance voice for the user with a volume and a quality of tone corresponding to the read hearing sensitivity data, and the hearing sensitivity data set for the voice output is updated each time a predetermined time for an operation of the user lapses to increase the volume of the output voice, and/or modify the tone quality thereof to thereby aid the hearing of the speech guidance.

10 Claims, 5 Drawing Sheets

METHOD AND APPARATUS FOR PROVIDING A VOICE OUTPUT FOR CARD-BASED AUTOMATIC TRANSACTION SYSTEM

BACKGROUND OF THE INVENTION

The present invention relates to generation of a voice output for use in a card-based automatic transaction system and in particular, to a method and apparatus for providing a voice output based on the hearing sensitivity or hearing level of a card user for an automatic teller machine, such as, an automatic cash dispenser, a telephone or an automatic ticket vending machine.

Among the users of an automatic teller machine (referred to as an ATM herebelow), many persons, e.g. handicapped persons are not familiar with the operation thereof. These users take a long period of time for the input operation and hence a considerable time to complete the input; consequently, when a time-out takes place during the input operation, the operation is ordinarily guided or indicated by voice. However, those persons not familiar with the operation of the ATM include persons having a lowered sense of sight or having difficulty in hearing (i.e. deafness) in many cases, and hence the guidance and indication by a voice with a volume and a quality each set to predetermined average values do not effectively serve for such users. In the conventional ATM, the operation thereof is guided and indicated by a fixed amount of artificial output speech or voice regardless of the condition of the user (deaf) having difficulty in hearing.

For example, as described in the JP-A-No. 59-149560, a prior art apparatus for guiding ATM operations by voice includes a speech synthesizing LSI for producing a speech output in which a selection is made between the fixed words predetermined for the items of an ID and an account number and the variable words including a name read from the card, an input amount, and an amount of payment, thereby achieving an operation guidance for the user.

The JP-A-No. 60-10387 discloses an automatic transaction system for handicapped persons which includes a display unit with braille pins and which is capable of handling a transaction card including a record indicating that the user is a person having difficulty of the sense of sight. In the former, each word information is stored at a specified memory address, and when a predetermined instruction is issued, information is fetched from the memory to generate a voice output, namely, this technology relates to a method for generating words of the operation guidance. Moreover, in the latter, the transaction cards are classified into two types, namely, for the sound persons and for the visually handicapped persons, and when a card is installed in the apparatus, the card is judged to determine the type thereof. For a card of a visually handicapped person, the user identification is first confirmed and the guidance is conducted for the secret number entry and the transaction amount entry in this sequence.

However, the system of the JP-A-No. 59-149560 is not particularly designed for those who have difficulty in hearing, namely, this system generates a voice output in various cases. For example, if a user inadvertently leaves an article in the ATM, a speech message of variable words is announced as "Mr. (Ms.) X, you have an article left behind. Please contact the window teller." In addition, the system of the JP-A-No. 60-10387 is not oriented for those who have difficulty in hearing or those who has deteriorated sense of sight but the system is dedicated to the use by the visually handicapped persons. Since the conventional apparatus including these systems achieve the voice output with the fixed volume and tone quality, considerations have not been given for those who have difficulty in hearing and for those who have lowered hearing sensitivity.

SUMMARY OF THE INVENTION

It is therefore an object of the present invention to provide a method and apparatus for providing a voice output for an automatic teller machine in which the voice output for the guidance and indication of operations can be compensatively controlled in accordance with a data on the hearing sensitivity of the user recorded on his or her transaction card or a detection of an emergency, thus eliminating the above prior art problems.

Another object of the present invention is to provide a method and apparatus for providing a voice output for use in an automatic teller machine processing transactions by use of a card in which the voice outputs for the guidance and indication of the operation are selectively or progressively strengthened based on the operational situation of such as those who have difficulty in hearing and the aged not familiar with the operation of the automatic teller machine.

To achieve the objects, in the method and apparatus of electrically generating a voice output, for use in the automatic teller machine in accordance with the present invention, there is prepared a transaction card in which the hearing sensitivity of the user of the card is recorded/embossed, and when the card is installed in a card input section of the apparatus, information on the hearing sensitivity recorded in the card is detected, the volume and guality of tone of a voice generating means of the apparatus are controlled depending on user's hearing sensitivity, and the voice of guidance and/or speech indication of the operation is provided to compensate for lowering of the user's hearing sensitivity. Additionally, the information of the hearing sensitivity set for the voice output is updated in accordance with the result of the operation conducted by the user so as to generate a voice output suitable for hearing of the user.

According to the configuration of the present invention, when a voice operation guidance, voice guidance and response to a balance inquiry, or the like is conducted for the user of an ATM, the voice output can be achieved depending on the hearing sensitivity recorded in the user's card; which therefore enables to relieve the uneasiness of the aged and those who have difficulty in hearing and to improve the conveniences for the user. If the ATM is installed in a box outside the main building, the voice output section can also be controlled by use of an output from a sensor upon occurrence of fire, earthquake or the like.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
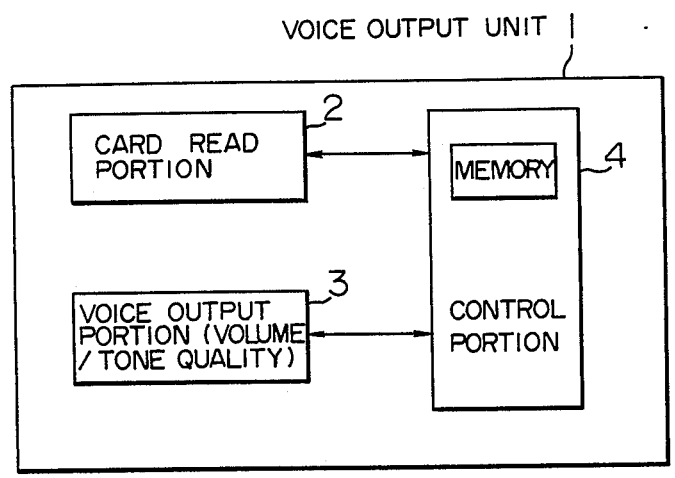
FIG. 1 is a schematic block diagram illustrating a voice output apparatus according to an embodiment of the present invention.

A description will be given of the embodiments of the present invention with reference to the accompanying drawings. FIG. 1 is a block diagram of a voice output apparatus for an ATM as an embodiment of the present invention. This system includes a voice output unit 1, a card read portion 2 having a function to read the content of a card installed in this portion 2 and a function as an interface for an IC card, a voice output portion 3 having a speech synthesizing IC for generating a voice output of predetermined words with specified volume and tone quality, and a control portion 4 including a microprocessor (MCU), a program memory, and a data memory for controlling the card read portion 2 and the voice output portion 3. As the voice output portion 3, an apparatus of the widely known type, for example, the configuration illustrated in FIG. 11 of the JP-A-No. 59-149560 may be utilized including a speaker, an earphone to be installed in the console table of the ATM.

When the user inserts a card into the card read portion 2 of the apparatus 1, the card read portion 2 reads a magnetic stripe section 6 of the inserted card in which the hearing sensitivity data of the user has been recorded and sends the data to the control portion 4. On receiving the data, the control portion 4 stores the hearing sensitivity data in the data memory, reads the stored data, executes a predetermined operation thereon, and transmits a signal to indicate a sound volume and a tone quality each corresponding to the hearing sensitivity to the voice output portion 3. This indication signal indicates a volume determined according to the decibel value of the difficulty of the hearing sensitivity and a tone quality determined by a frequency band (e.g. 3-6 kHz) to be easily sensed by the hearing organ of the user. When a voice output is required during an operation or the like of the user, the request is keyed in to the control portion 4. This causes the control portion 4 to generate an indication signal, and then the voice output portion 3 generates a voice output with the indicated volume and quality of tone.

Figure 2A:
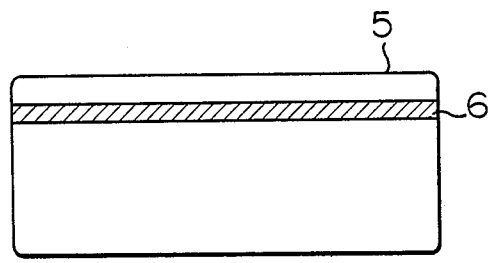
FIGS. 2A and 2B are diagrams respectively illustrating appearances of examples of cards to be used for the apparatus of FIG. 1.
Figure 2B:
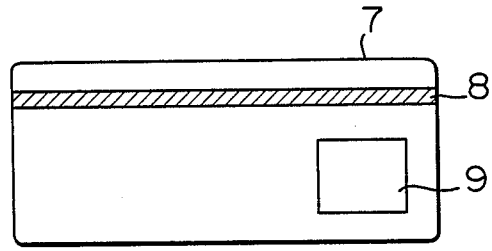

FIGS. 2A-2B are diagrams illustrating appearances of cards used for the system of FIG. 1. FIG. 2A shows a magnetic card in which the recording is effected only on the magnetic stripe, whereas FIG. 2B shows an IC card including an IC or an LSI in addition to the magnetic stripe. In both FIGS. 2A-2B, the hearing sensitivity of the user is recorded in the magnetic stripe sections 6 and 8 of the cards 5 and 7, respectively. Naturally, the magnetic stripe sections 6 and 8 each are used to record ID codes such as a name code and a passbook number code. An IC 9 is capable of storing in a memory built therein other items such as desired voice control information, a deposit balance, a debt amount, and an address. A data send/receive function may be included in the IC 9.

Although not shown, as a modification of an IC card of FIG. 2B, the hearing sensitivity data of the user and the guidance voice control indication data may also be stored in a memory of the IC card.

Figure 2C:
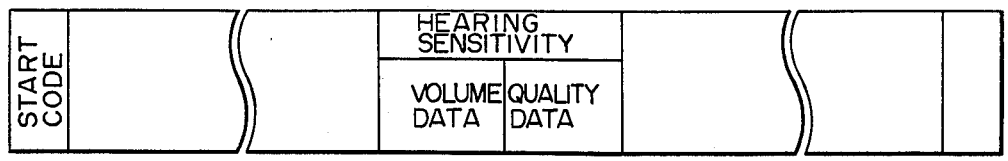
FIGS. 2C and 2D are diagrams respectively illustrating record formats of the contents recorded in the cards.
Figure 2D:
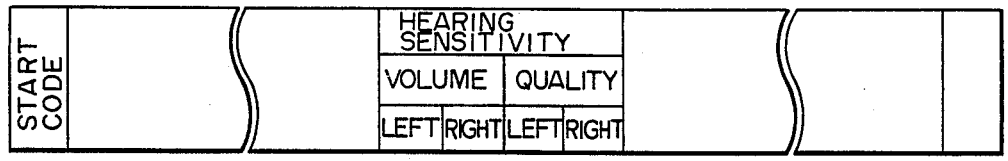

FIGS. 2C-2D respectively show record formats of hearing sensitivity data to be recorded in the cards. The format of FIG. 2D relates to the volume and quality of tone and includes the hearing sensitivity data for the right and left ears of the user. In FIGS. 2A-2B, the data items are recorded on the magnetic stripes in the format described above.

Figure 3:
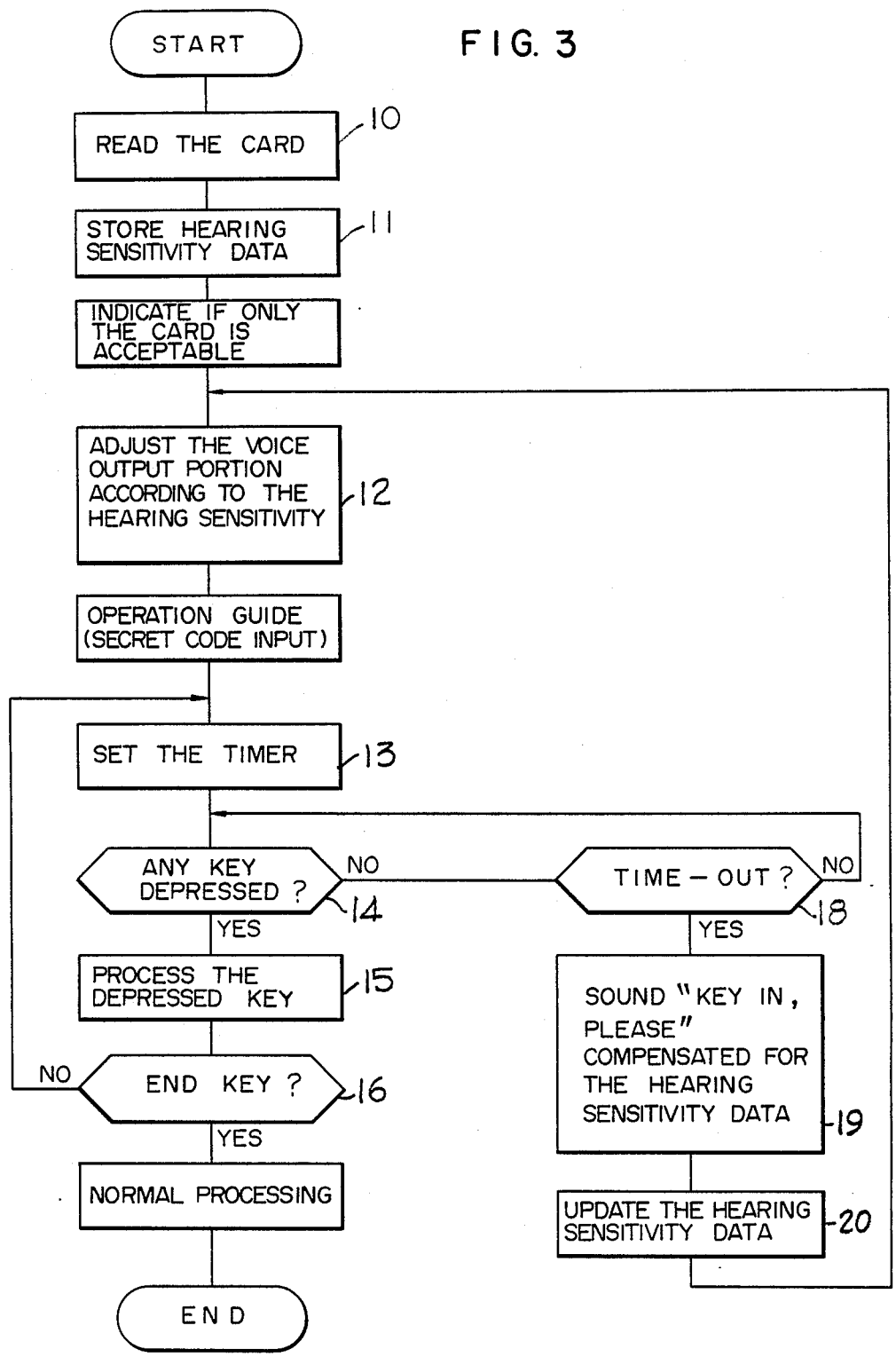
FIG. 3 is a flowchart illustrating the operation in the apparatus of FIG. 1.

FIG. 3 is a flowchart showing the operation of the system of FIG. 1. First, the user installs a card in the ATM apparatus 1. The card read portion 2 of the ATM apparatus 1 reads the installed card (step 10), identifies the hearing sensitivity of the stripe data, and stores the sensitivity data in the memory of the control portion 4 (step 11). Based on the stored data, the control portion 4 generates an indication signal indicating the volume and quality of tone by executing a predetermined operation and then generates the indication signal to the voice output portion 3, thereby setting a state in which the voice output is to be adjusted (step 12). After the read operation is completed, when an operation indication is issued in response to acceptance of the card, a period of time is set to monitor the operation of the user (step 13), and then the system enters a state to wait for an input of a transaction operation key or an inquiry operation key depressed by the user (step 14). If it is judged that a key input of the user is present, a processing associated with the depressed key is executed (step 15). For example, in a case of a deposit transaction, when a secret number is inputted, the system identifies the secret number, makes an inquiry to the ATM center, and delivers the notes inserted according to an input of the deposit amount to the discriminator, which effects the discrimination of the notes.

In a case of a withdrawal transaction, also when a secret number is inputted, the system identifies the secret number, makes an inquiry to the ATM center, checks the balance of the deposit amount, and delivers to the discriminator predetermined notes from the cashbox according to the input of the withdrawal amount. The notes are then discriminated and are transported to the outlet.

Next, when the depressed key is found to be the end key (step 16), the monitor time is again set (step 13) and the system enters a state to wait for a key input (step 14).

If the operation key input of the user is not detected and hence a time-out of the monitor time (variable from 10 sec. to 30 sec.) is assumed (step 18), a guidance output to guide the operation of the user is accomplished by a voice according to the hearing sensitivity, for example, "Perform a key input, please." is announced (step 19). The voice output is not only achieved at a time-out, namely, it should be noted that the voice output is also effected in a case other than a time-out, for example, at an inquiry for the amount. Next, to allow the ATM to perform again the voice guidance, the value of the stored hearing sensitivity is incremented (step 20) and the voice output portion 3 is re-adjusted. This causes the output from the voice output portion 3 to reflect the volume and quality of tone associated with the hearing sensitivity (step 12). The timer is accordingly set to wait for a key depression of the user (steps 13–14). As described above, each time a time-out (for a variable period of time ranging from 10 sec. to 30 sec.) occurs because the user does not depress any key, the data on the hearing sensitivity is updated. As a result, the volume of tone is increased for each time-out and the quality of tone is selected in accordance with a frequency band to be easily sensed by the hearing organ of the user, thereafter, the thus-changed voice output is generated.

In the flowchart of FIG. 3, when the card of the record format of FIG. 2D is used, the voice output portion 3 is adjusted in the step 12 in accordance with the hearing sensitivity values of the right and left ears and the operation guidance is conducted by a voice matching the hearing sensitivity values of the right and left ears in step 19.

Figure 4:
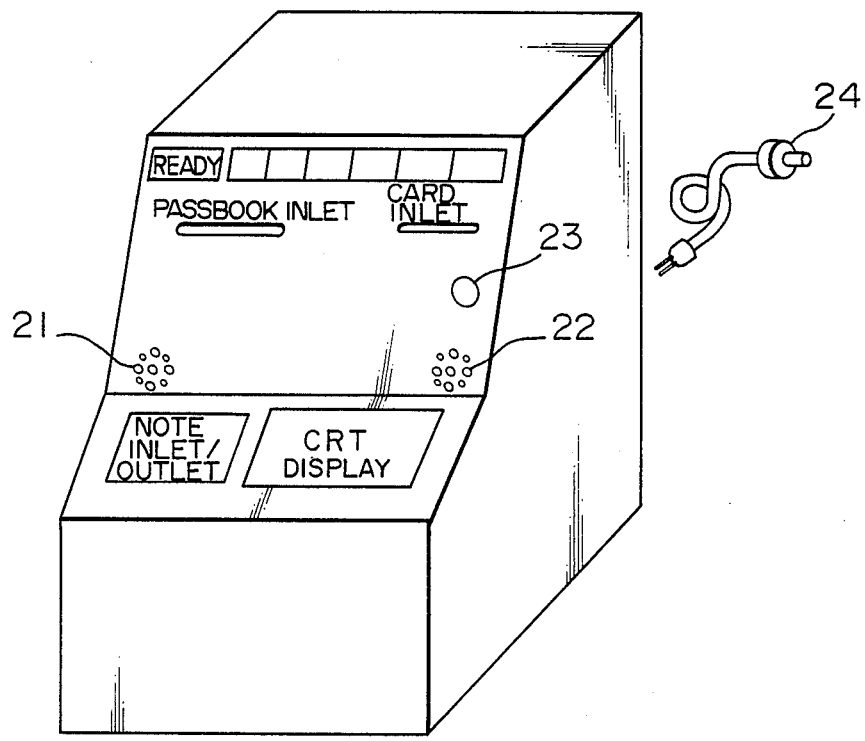
FIG. 4 is a diagram illustrating an appearance of an automatic teller machine.

FIG. 4 shows an appearance of an ATM for a localized usage. In this ATM, the operation guidance is carried out depending upon the hearing sensitivity by use of the speakers 21–22 disposed on the left and right sides of the ATM. Also, for an earphone 24 to be optionally used, the voice guidance is available with the volume and quality of tone depending on the hearing sensitivity.

Figure 5:
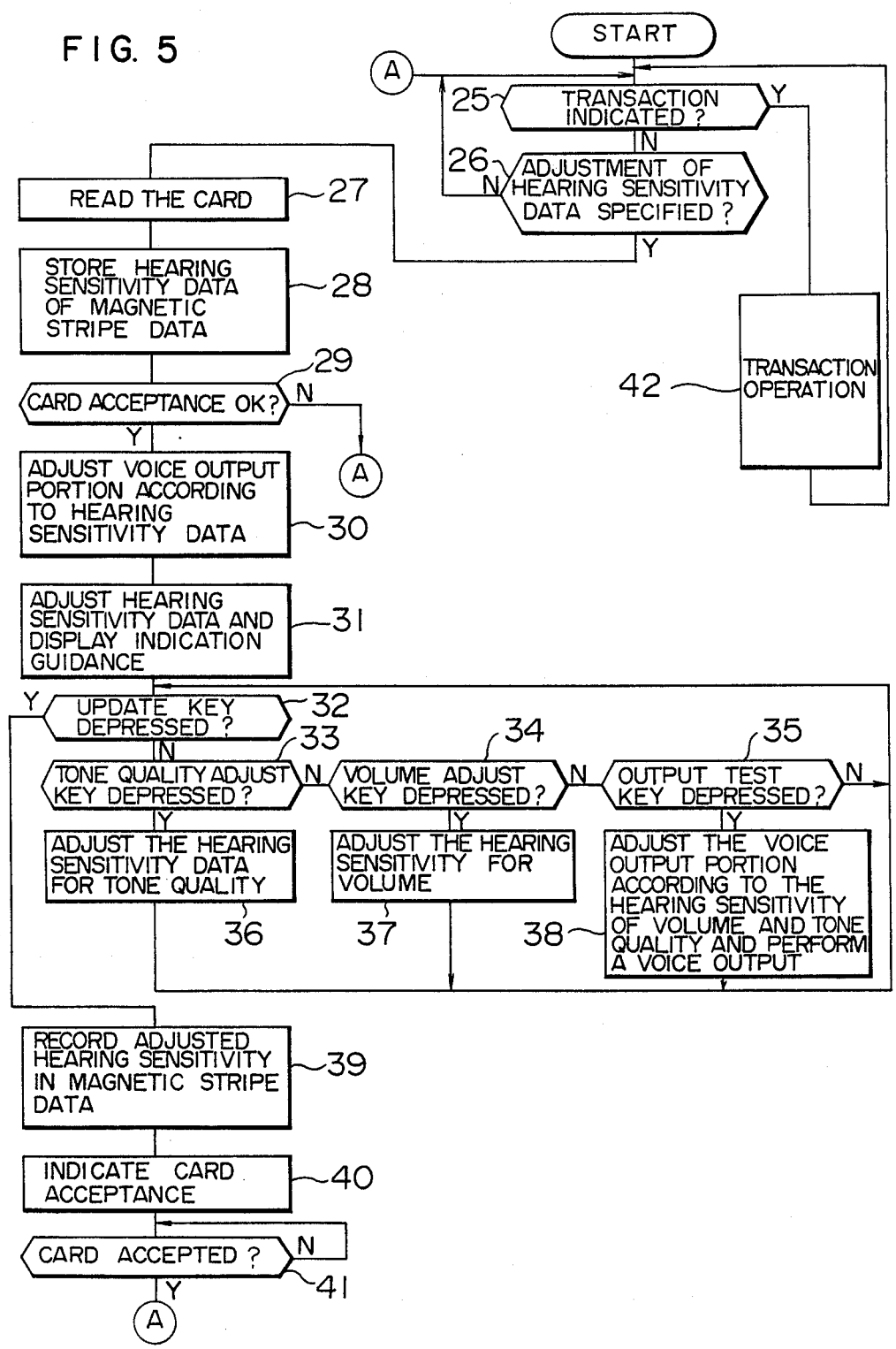
FIG. 5 is a flowchart illustrating an operation to adjust the hearing sensitivity recorded in a card.
Figure 6:
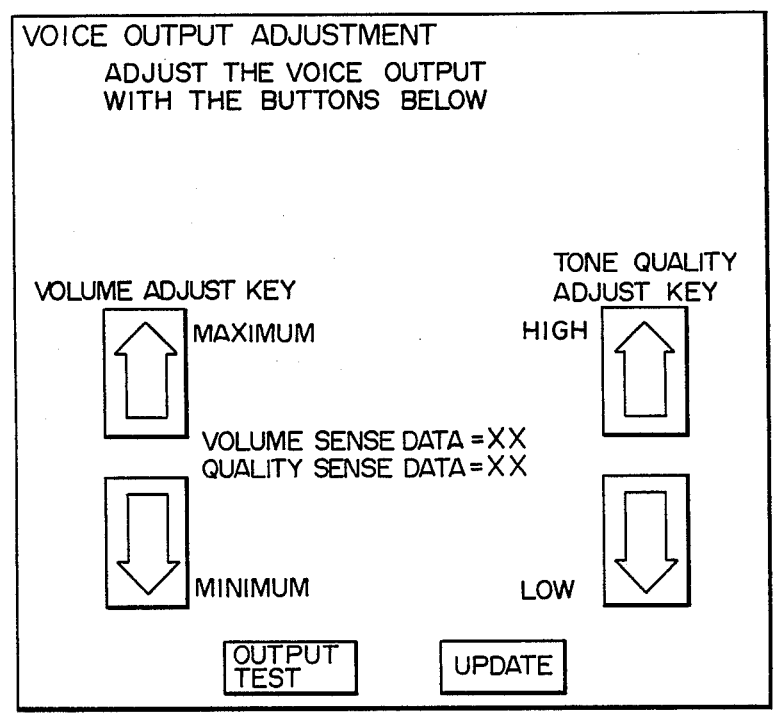
FIG. 6 is a schematic diagram illustrating a display example of a hearing sensitivity adjusting indication guidance applied to an automatic teller machine.

FIG. 5 is a flowchart showing an operation to adjust data of the hearing sensitivity recorded in the magnetic stripe of the card. On detecting a condition that the user desires to adjust the hearing sensitivity data (step 26), the system reads the card of the user (step 27), stores the hearing sensitivity data read from the magnetic stripe (step 38), and judges to determine whether or not the card is adjustable (step 29). If the card is acceptable, the voice output portion is adjusted according to the recorded hearing sensitivity data (step 30). Next, the hearing sensitivity adjusting guidance (FIG. 6) is displayed on a display device such as a CRT or an LCD (step 31), and then the system is ready to wait for depression of an adjust key. When depression of the volume adjust key is detected (step 33), the hearing sensitivity for the volume is adjusted to a desired value (step 36). When a depression of the tone quality adjust key is detected (step 34), the hearing sensitivity for the tone quality is adjusted to a desired value (step 37). If depression of the output test key is detected (step 35), the voice output portion 3 is adjusted with the hearing sensitivity associated with the adjusted volume and quality of tone and then the voice output is provided (step 38). If the adjusted voice output matches the hearing sensitivity of the user, the user depresses the update key. When the depression of the update key is detected (step 32), the adjusted hearing sensitivity is recorded in the data of the magnetic stripe (step 39), an indication of the card reception is outputted for the user (step 40), and a wait state is set to wait for the reception of the card (step 41). If the card is unloaded, the operation of the hearing sensitivity adjustment is completed, thereafter, the system detects an indication of an ordinary transaction (step 25) or an indication of the adjustment (step 26).

As described above, the adjustment can also be effected to achieve the voice output compensatively matching with the hearing sensitivity of the user.

Although the embodiment has been described for a case of an apparatus having the configuration of FIG. 1, other functional circuits may be naturally added thereto. Moreover, in the embodiment, the hearing sensitivity is recorded on a magnetic stripe as shown in FIGS. 2A–2B, however, the hearing sensitivity may be recorded in an RAM or an ROM disposed in the IC 9. Furthermore, although the embodiment has been described to have the processing operation flow as shown in FIG. 3, an operation flow having the different sequence may naturally be used. For example, there may be considered a flow in which the step 16 is omitted or a flow to which other processing operation is added.

While the present invention has been described with reference to the particular illustrative embodiments, it is not restricted by those embodiments but only by the appended claims. It is to be appreciated that those skilled in the art can change and modify the embodiments without departing from the scope and spirit of the present invention.

I claim:

1. A method of providing a voice output for a card-based automatic transaction system including card read means for reading the content of a card and voice output means for guiding by voice an operation procedure of the automatic transaction system for a user comprising the steps of:
   (a) recording on the card of the user in advance data representing hearing sensitivity of the user;
   (b) detecting and storing the hearing sensitivity data recorded on the card when the user loads the card in the automatic transaction system;
   (c) generating, based on the stored hearing sensitivity data, a signal for setting a volume/tone quality to said voice output means; and
   (d) controlling an output from said voice output means by use of the signal generated in the steps (c) and outputting an indication voice/guidance voice for the user so that the output voice compensates for the hearing sensitivity of the user with respect to volume and/or tone quality.

2. A method according to claim 1 further including a step for updating the stored hearing sensitivity data in accordance with the result of an operation conducted by the user to change the volume/tone quality of said voice output means.

3. A method according to claim 2 wherein said volume/tone quality change step updates the stored hearing sensitivity data so as to increment the volume and/or change an output frequency band each time a period of time allocated to each operation procedure lapses.

4. A method according to claim 2 wherein said volume/tone quality change step is initiated when an indication of an update request from the user is inputted.

5. A method according to claim 2 wherein said volume/quality change step overrides the stored hearing sensitivity data and generates a warning output to said voice output means in response to an output from detect means for detecting an emergency.

6. An automatic transaction system including card read means for reading the content of a card and voice output means responsive to loading of the card for generating a guidance voice output on an operation procedure comprising:
   detection means for reading a card in which a hearing sensitivity data of the user is recorded and detecting the recorded hearing sensitivity data;
   store means for storing the data from said detection means;
   signal generating means coupled to said store means for generating an indication signal to set a volume/tone quality in accordance with the stored hearing sensitivity data; and control means coupled to the output of said signal generating means for controlling said voice output means so as to compensatively output an indication voice and/or a guidance voice for the user in accordance with said indication signal.

7. A system according to claim 6 further including update means for detecting a condition that an operation has failed within a preset period of operation time and updating the content of said store means to increase the volume of output and/or modify the tone quality thereof.

8. A system according to claim 6 wherein said store means is reset in response to unloading of the card.

9. A system according to claim 6 wherein said voice output means includes at least a pair of speakers disposed on both sides, respectively of a transaction console table, said system further comprising set means for selectively setting outputs from said pair of speakers, based on hearing sensitivity data of left and right ears of the user recorded in a card and read out therefrom.

10. A system according to claim 6 wherein said voice output means includes an earphone, said system further includes means for enabling a manual adjustment on an output from said signal generating means while a data from said detection means is being detected.

* * * * *